US012212171B1

(12) United States Patent
Allen et al.

(10) Patent No.: US 12,212,171 B1
(45) Date of Patent: Jan. 28, 2025

(54) CHARGING RECEPTACLE INTEGRATED IN A TRIM RING

(71) Applicant: Research & Design Innovations, LLC, Branford, CT (US)

(72) Inventors: Donald Terry Allen, Madison, CT (US); Kevin Hannula, Bloomington, IN (US)

(73) Assignee: Research & Design Innovations, LLC, Branford, CT (US)

( * ) Notice: Subject to any disclaimer, the term of this patent is extended or adjusted under 35 U.S.C. 154(b) by 572 days.

(21) Appl. No.: 17/469,635

(22) Filed: Sep. 8, 2021

Related U.S. Application Data

(60) Provisional application No. 63/075,457, filed on Sep. 8, 2020.

(51) Int. Cl.
H02J 7/00 (2006.01)
H01R 13/52 (2006.01)
H01R 13/717 (2006.01)
H01R 13/72 (2006.01)

(52) U.S. Cl.
CPC ........ H02J 7/0045 (2013.01); H01R 13/5213 (2013.01); H01R 13/7175 (2013.01); H01R 13/72 (2013.01)

(58) Field of Classification Search
CPC .............. H02J 7/0045; H01R 13/5213; H01R 13/7175; H01R 13/72
See application file for complete search history.

(56) References Cited

U.S. PATENT DOCUMENTS

| 9,935,408 B1* | 4/2018 | Pathak | H01R 13/7175 |
| 10,988,389 B1* | 4/2021 | Guduru | B65D 47/32 |
| 2016/0224064 A1* | 8/2016 | Fleisig | G06F 1/266 |
| 2017/0021761 A1* | 1/2017 | Umeda | B60Q 3/20 |

* cited by examiner

Primary Examiner — Robert Grant
(74) Attorney, Agent, or Firm — DeLio Peterson & Curcio LLC; Kelly M. Nowak

(57) ABSTRACT

An integrated charging receptacle including a ring body having an inner ring wall and an outer ring wall, a groove between the inner ring wall and outer ring wall for securing a wire or cable and a USB receptacle having a receptacle jack. The USB receptacle is disposed on a portion of the ring body and faces outward from the outer wall of the ring body. The ring body may be secured around a cup holder mountable in a surface or around an instrument gauge in a surface. The ring body may be secured around a dashboard instrument. The integrated charging receptacle may include a second USB receptacle having a second receptacle jack. The USB receptacle may be powered through an electrical wire passing through a portion of the body groove. The integrated charging receptacle may include at least two additional USB receptacles. The ring body may be substantially translucent.

20 Claims, 7 Drawing Sheets

CHARGING RECEPTACLE INTEGRATED IN A TRIM RING

BACKGROUND OF THE INVENTION

1. Field of the Invention

The present invention relates to a mounting location/method for a USB charging port. It provides a single USB receptacle or more than one USB receptacle. It may incorporate a USB-A (the standard USB receptacle), USB-C, or an Apple lightning plug or any combination thereof.

2. Description of Related Art

Many USB chargers exist in the market and fall into two categories. Chargers requiring a charging block or plug in transformer and chargers integrated into electronic devices such as laptops, computers, mobile devices and 120V plug outlets. Some are concurrently used as data transfer devices such as those using a PC, laptop or mobile device.

SUMMARY OF THE INVENTION

Bearing in mind the problems and deficiencies of the prior art, it is therefore an object of the present invention to provide a USB charging receptacle in a convenient location on a marine vessel or RV.

It is another object of the present invention to provide a USB charging receptacle which is aesthetic.

A further object of the invention is to provide a USB charging receptacle which has a low profile.

It is yet another object of the present invention to provide a USB charging receptacle for a device in a dashboard.

It is still another object of the invention to provide a USB charging receptacle ring having multiple receptacles.

Still other objects and advantages of the invention will in part be obvious and will in part be apparent from the specification.

The above and other objects, which will be apparent to those skilled in the art, are achieved in the present invention which is directed to an integrated charging receptacle including a ring body having an inner ring wall and an outer ring wall, a groove between the inner ring wall and outer ring wall for securing a wire or cable and a USB receptacle having a receptacle jack, the USB receptacle disposed on a portion of the ring body. The receptacle jack faces outward from the outer wall of the ring body. The ring body may be secured around a cup holder mountable in a surface. The ring body may be secured around an instrument gauge in a surface. The ring body may be secured around a dashboard instrument. The integrated charging receptacle may include a second USB receptacle having a second receptacle jack. The integrated charging receptacle may include a weather resistant stopper or protective cap for sealing the USB receptacle when the USB receptacle is not in use, the protective cap connected to the integrated charging receptacle by a flexible attachment cord. The USB receptacle may be powered through an electrical wire. The USB receptacle is powered through an electrical wire passing through the body groove. The integrated charging receptacle may include at least two additional USB receptacles. The ring body may be substantially translucent and the ring body includes at least one LED for illuminating the ring body and wherein the LED may be powered from a power source supplying power to the USB receptacle.

Another aspect of the invention provides a method for installing an integrated charging receptacle. The method includes providing an integrated charging receptacle having a ring body including an inner ring wall and an outer ring wall, the integrated charging receptacle including a groove between the inner ring wall and outer ring wall for securing a wire or cable and a USB receptacle having a receptacle jack, the USB receptacle disposed on a portion of the ring body wherein the receptacle jack is facing outward from the ring body. The method includes placing the integrated charging receptacle around a device and mounting the device in an opening of a surface. The method may include a step of providing power to the receptacle jack through an electrical wire extending from an inside portion of the receptacle jack to a power source before or after placing the integrated charging receptacle around the device. The device may be a cup holder mountable in a surface. The device may be an instrument gauge mountable in a surface or a dashboard instrument mountable in a surface. The integrated charging receptacle may include a second USB receptacle having a second receptacle jack. The receptacle may be powered through an electrical wire and the electrical wire may pass through the body groove. The integrated charging receptacle may include at least two additional USB receptacles. The ring body may be substantially translucent and the ring body includes at least one LED for illuminating the ring body.

Another aspect of the invention provides a method for using an integrated charging receptacle. The method includes providing an integrated charging receptacle having a ring body including an inner ring wall and an outer ring wall, the integrated charging receptacle including a groove between the inner ring wall and outer ring wall for securing a wire or cable and a USB receptacle having a receptacle jack, the USB receptacle disposed on a portion of the ring body wherein the receptacle jack is facing outward from the ring body; wherein the integrated charging receptacle is disposed about a device mounted in a surface. The method includes plugging one end of a USB cord into the receptacle jack and plugging an opposite end of the USB cord into a device requiring charging.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment of the present invention, reference will be made herein to FIGS. 1-18 of the drawings in which like numerals refer to like features of the invention.

Figure 13:
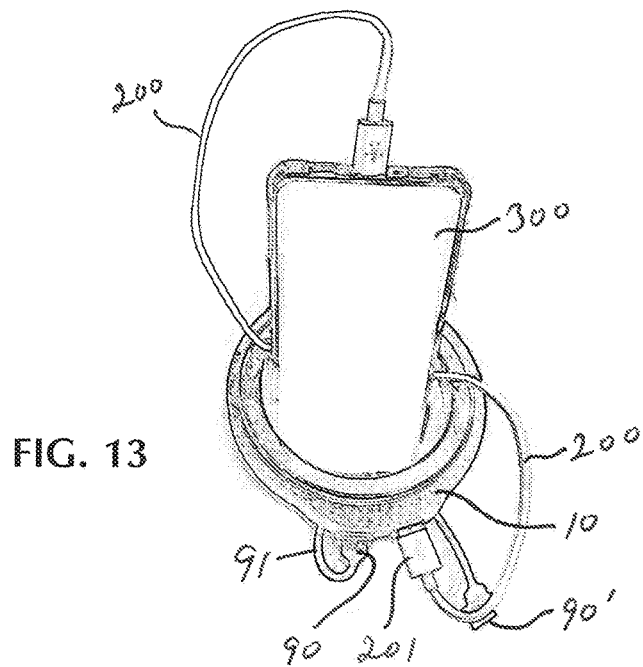
FIG. 13 is a top front perspective view of the second embodiment of the integrated charging receptacle installed in a cup holder with a smartphone connected to the USB cord.
Figure 14:
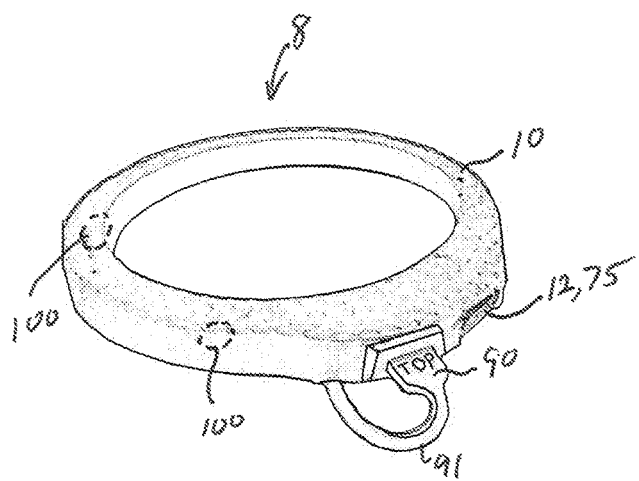
FIG. 14 is a top perspective view of the first integrated charging receptacle with a protective cap in the first charging port.
Figure 15:
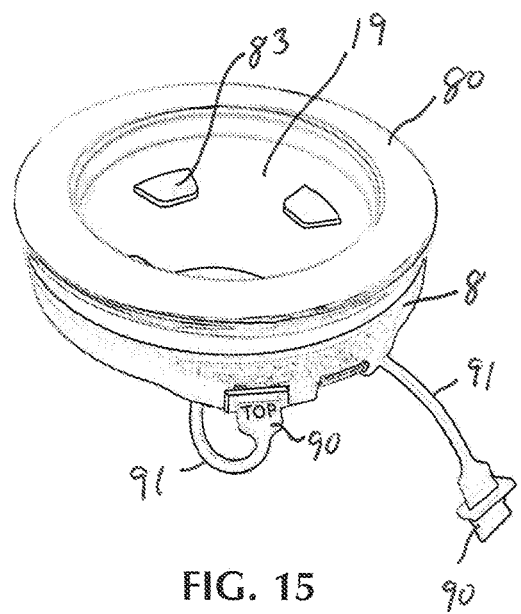
FIG. 15 is a front top perspective view of the first integrated charging receptacle installed in a cup holder with a first protective cap in the first charging port and a second protective cap removed from the second charging port.

In a first embodiment of the integrated charging receptacle 8 shown in FIGS. 13-15, the integrated charging receptacle ring 8 may be mounted to a cup holder or other device. The ring body 10 is shown in FIGS. 1, 3, 5, 7, 9 and 11. The integrated charging receptacle 8 is disposable below the lip of a cup holder or other device and includes two or more USB charging ports.

Figure 1:
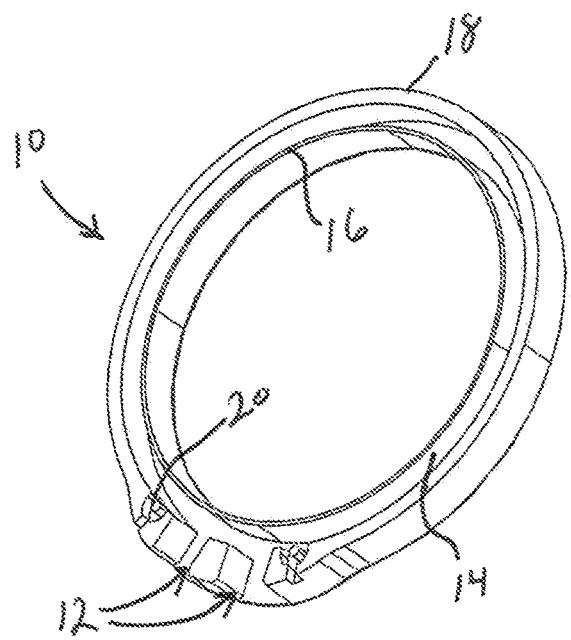
FIG. 1 is a front bottom perspective view of a first embodiment of the integrated charging receptacle according to the present invention.
Figure 2:
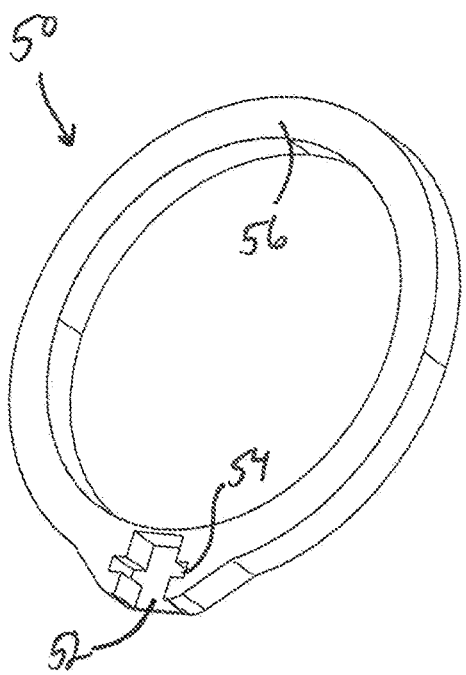
FIG. 2 is a front bottom perspective view of a second embodiment of the integrated charging receptacle according to the present invention.
Figure 3:
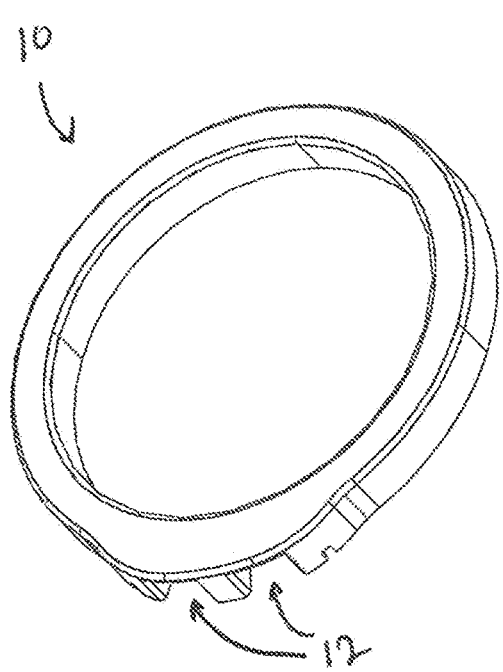
FIG. 3 is a front top perspective view of the first embodiment of the integrated charging receptacle shown in FIG. 1.
Figure 4:
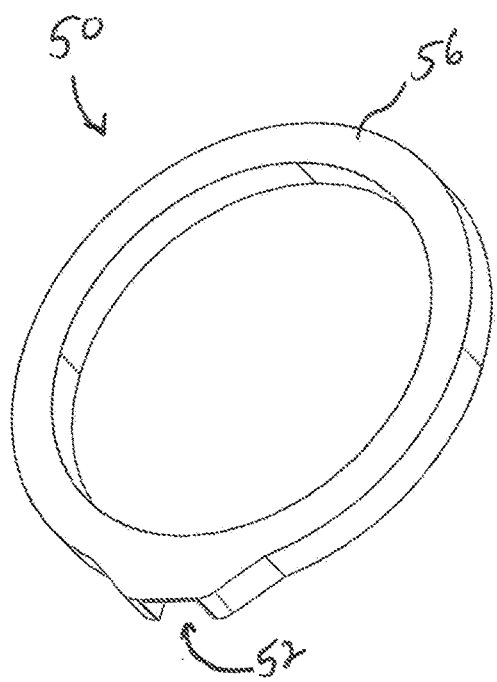
FIG. 4 is a front top perspective view of the second embodiment of the integrated charging receptacle shown in FIG. 2.
Figure 5:
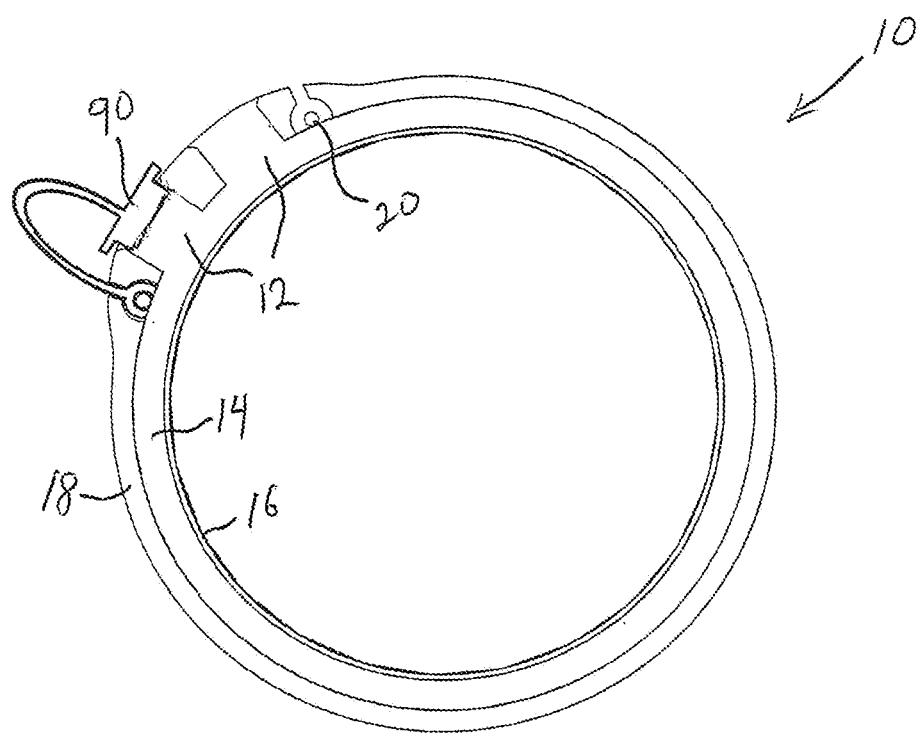
FIG. 5 is a bottom plan view of the first embodiment of the integrated charging receptacle shown in FIG. 1.
Figure 6:
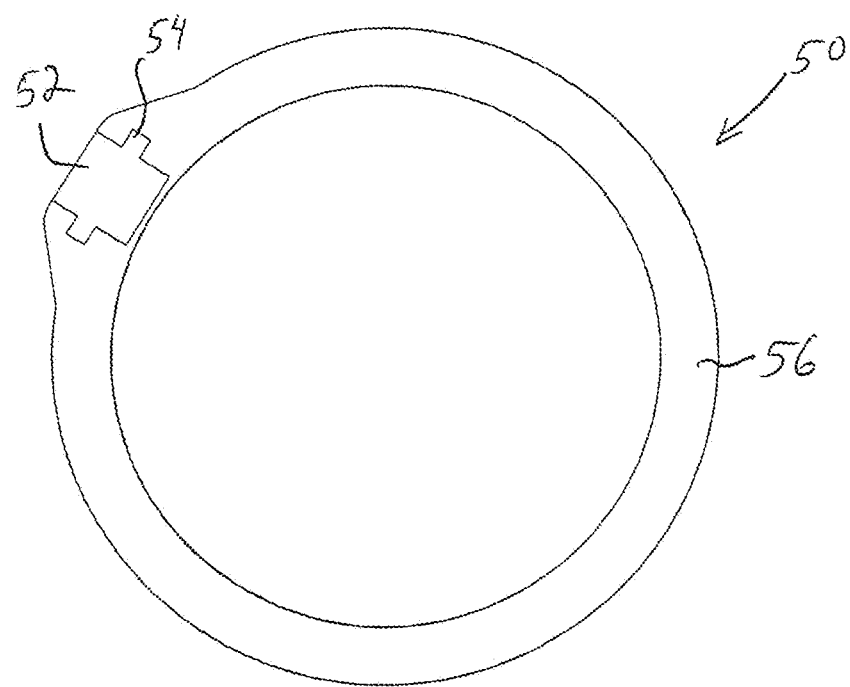
FIG. 6 is a bottom plan view of the second embodiment of the integrated charging receptacle shown in FIG. 2.
Figure 7:
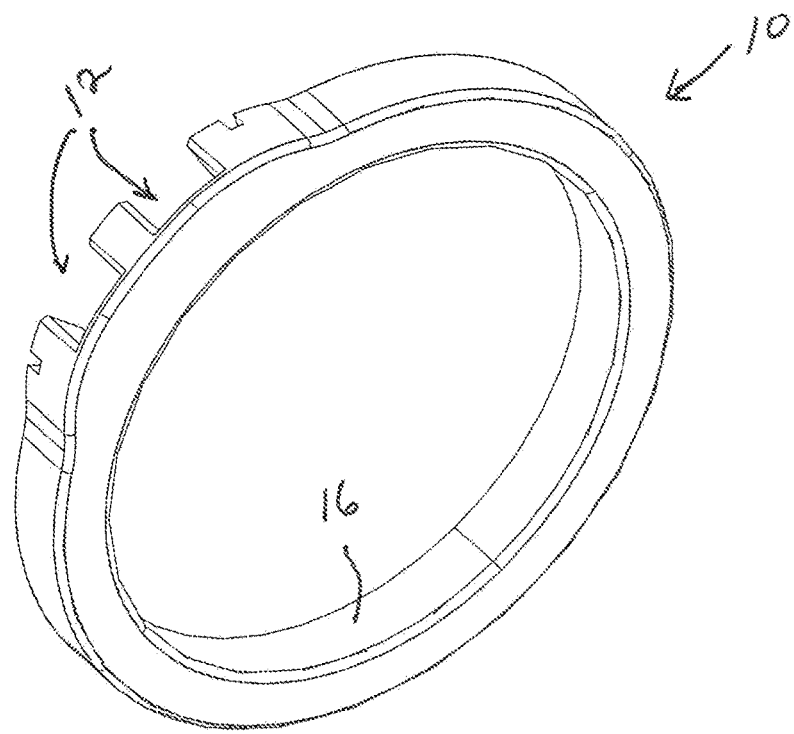
FIG. 7 is a front top perspective view of the first embodiment of the integrated charging receptacle shown in FIG. 1.
Figure 8:
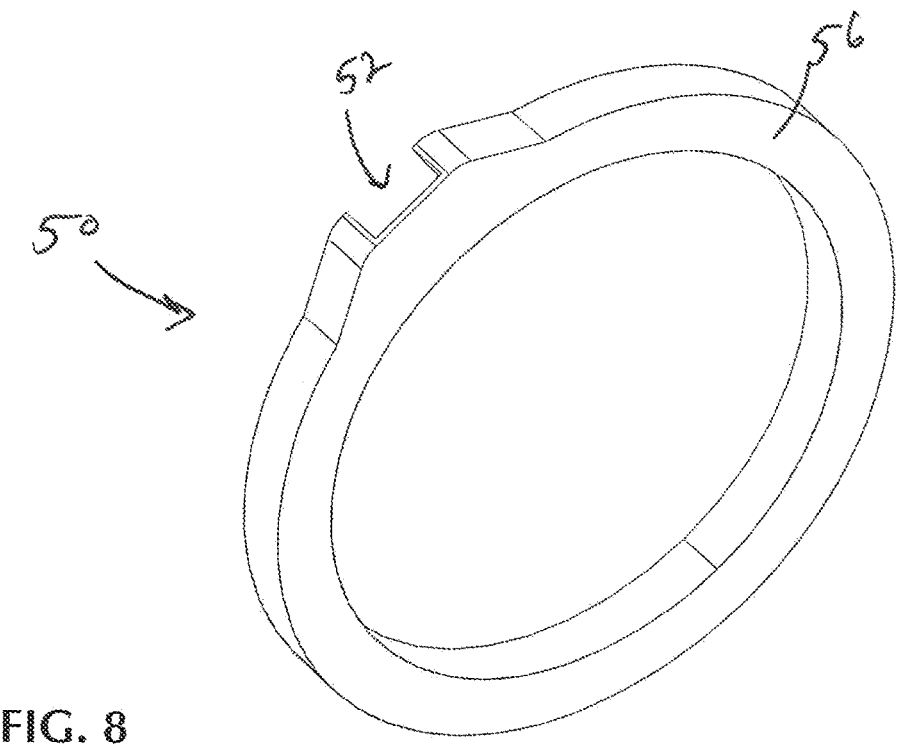
FIG. 8 is a front top perspective view of the second embodiment of the integrated charging receptacle shown in FIG. 2.
Figure 9:
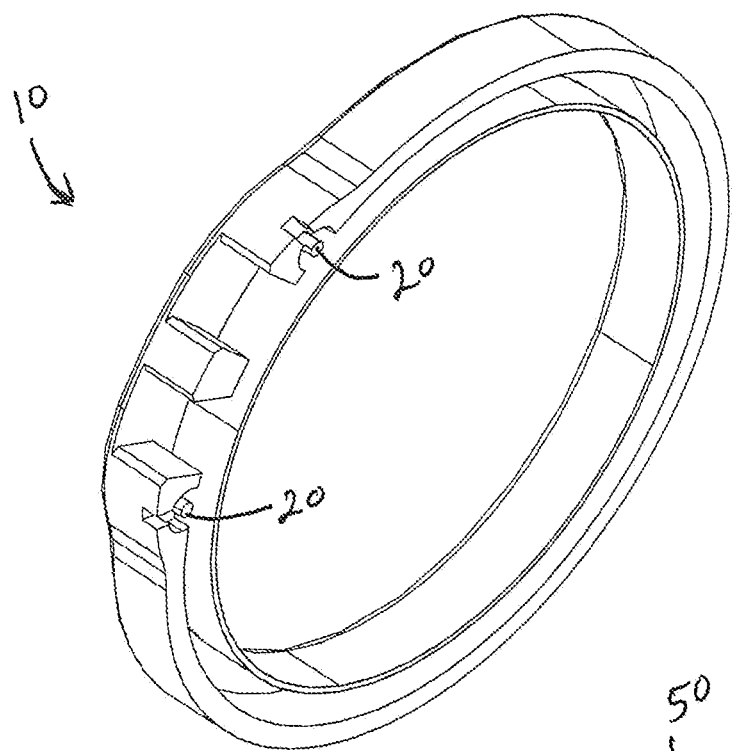
FIG. 9 is a front bottom perspective view of the first embodiment of the integrated charging receptacle shown in FIG. 1.
Figure 10:
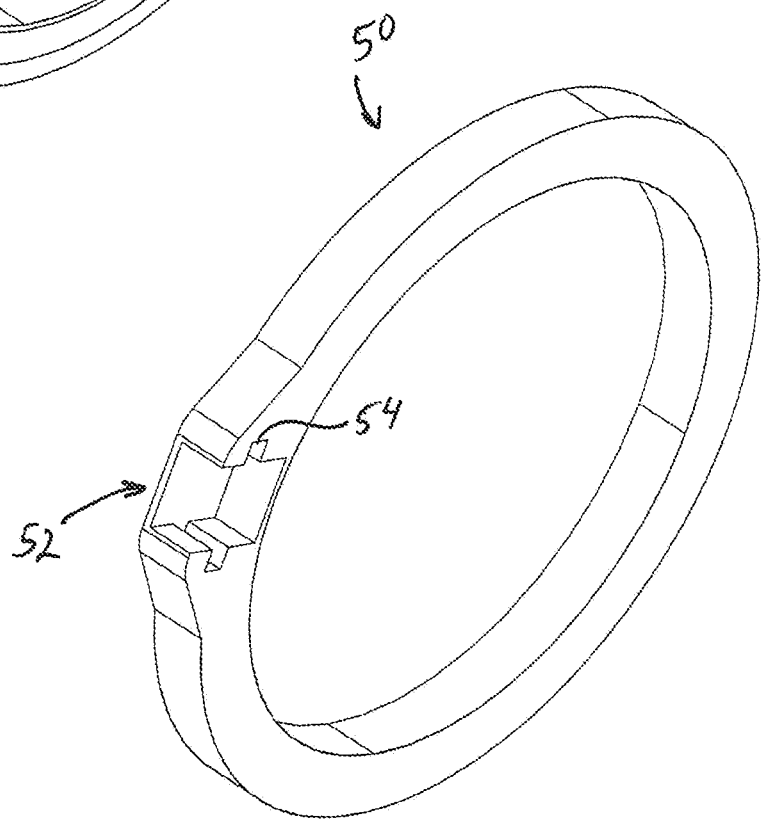
FIG. 10 is a front bottom perspective view of the second embodiment of the integrated charging receptacle shown in FIG. 2.
Figure 11:
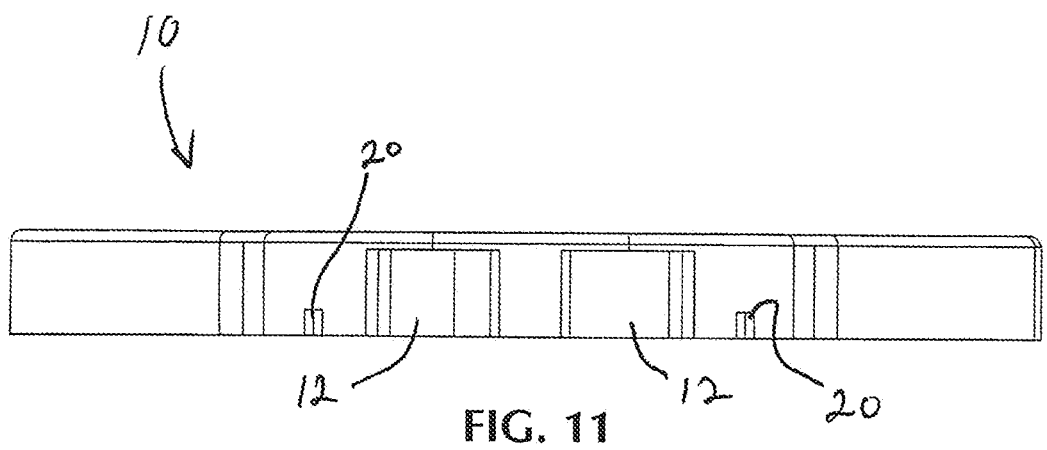
FIG. 11 is a front view of the first embodiment of the integrated charging receptacle shown in FIG. 1.

The integrated charging receptacle 8 (FIGS. 13-15) includes a ring body 10 having an inner ring wall 16, an outer ring wall 18 and a groove 14 between the inner ring wall 16 and outer ring wall 18. The inner ring wall 16 may contact an outer wall surface of a cup holder, instrument gauge, audio control or other device. The devices to which the integrated charging receptacle 8 are engagable may be mounted in a surface opening such as a marine vessel deck, marine vessel instrumentation surface, armchair, RV instrumentation panel, RV interior surface, or any other surface which may require a USB or other charging port. The integrated charging receptacle 10 includes at least two port openings 12 for securing a USB or other charging adapter. As shown in FIG. 9, the integrated charging receptacle may include securing pins 20 for securing the cap attachment cord 91 to the ring body 10.

To install the integrated charging receptacle 8, the cup holder or other device listed above is slid from the surface opening to which the device is mounted. A notch in the surface opening may be required for the charging wiring in some instances. The integrated charging receptacle 8 is placed on the edge of the surface opening, and the cupholder or other device is re-installed through the center of the integrated charging receptacle.

One application for the integrated charging receptacle is a cup holder. People often use cup holders for drinks, keys, and cell phones, so the charging receptacle would be convenient for charging the cell phone.

Figure 12:
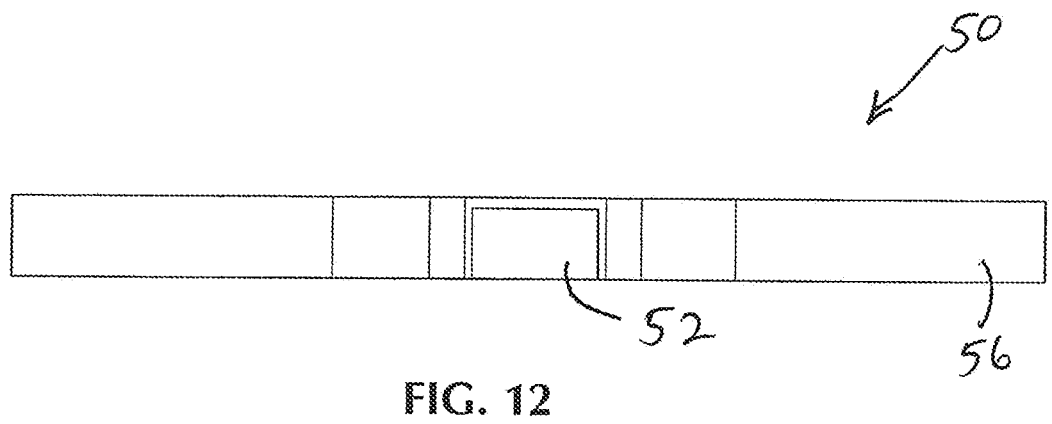
FIG. 12 is a front view of the second embodiment of the integrated charging receptacle shown in FIG. 2.

FIG. 12 shows the first embodiment of the integrated charging receptacle 8. A protective cap 90 is secured in one charging ports 12 for protecting the charging jack 75 secured inside the charging port 12 from moisture, debris and the like. FIG. 15 shows the protective cap 90 secured in the first charging port and a second protective cap 90' removed from the second charging port. The surface to which the integrated charging receptacle 8 is inserted includes a surface opening which cannot be seen since the cup holder is disposed in the surface opening with the integrated charging receptacle 8 between the cup holder rim 80 and the surface 84 adjacent the surface opening. The cup holder 19 may include flexible tabs 83 for securing beverage containers smaller than the cup holder opening. FIG. 13 shows the first charging jack covered by a protective cap 90. The second protective cap 90' does not cover a charging jack. A USB plug 201 on one end of the USB cord 200 is plugged into the receptacle jack 75.

FIG. 13 is a top front perspective view of the second embodiment of the integrated charging receptacle installed in a cup holder with a smartphone 300 connected to the USB cord 200 and shows the first embodiment of the integrated charging receptacle with a protective cap 90 in the first charging port or port opening 12.

FIG. 14 is a front top perspective view of the first embodiment of the integrated charging receptacle with a first protective cap in the first charging port and a second protective cap removed from the second charging port.

In a second embodiment of the integrated charging receptacle includes a ring body 50 shown in FIGS. 2, 4, 6, 8, 10, and 12. The ring body 50 or spacer may be a solid hoop 56 and is disposable below the lip of a cup holder or other device as listed in the first embodiment. The second embodiment of the integrated charging receptacle body 50 includes a single USB charging port opening 52. At least one indent 54 in the opening 52 may be used for securing a charging jack 75 in the USB charging port opening 52.

Figure 16:
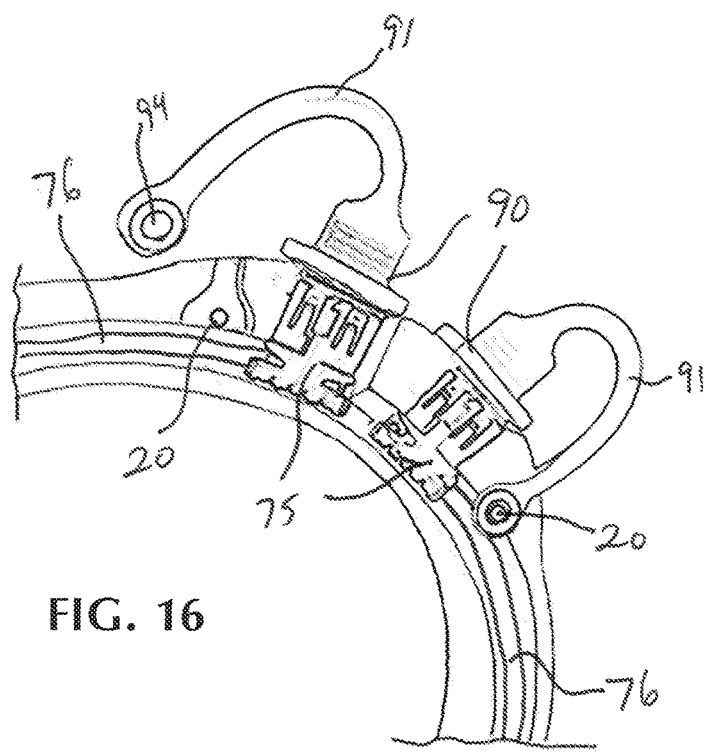
FIG. 16 is a perspective view of a portion of the integrated charging receptacle showing the charging jack, protective cap, cap attachment cord and charge port power wire.
Figure 17:
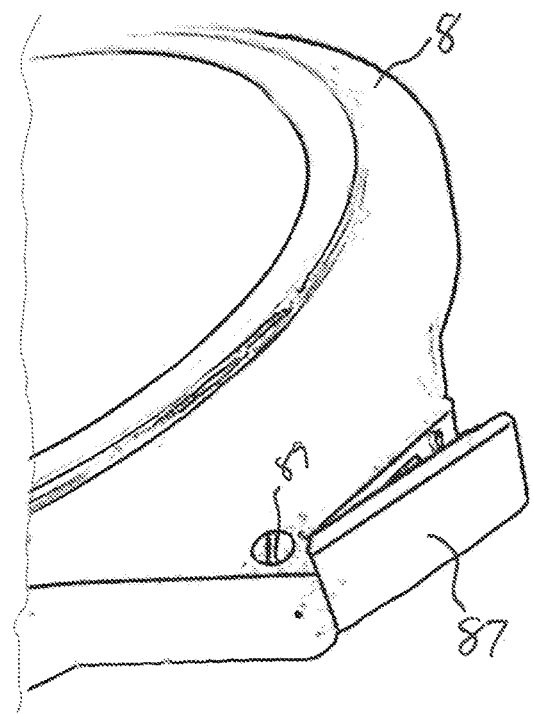
FIG. 17 is a perspective view of a portion of a second embodiment of the protective cover, charging jack and hinge screw with the protective cover in a partially closed position.
Figure 18:
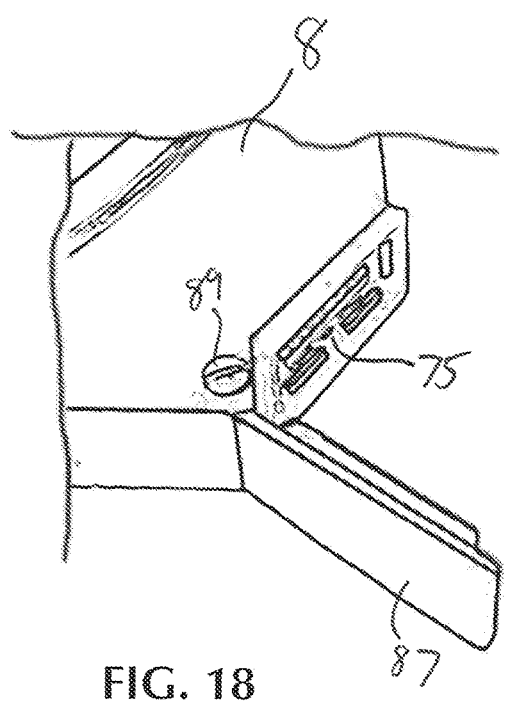
FIG. 18 is a perspective view of a portion of a second embodiment of the protective cover, charging jack and hinge screw with the protective cover in an open position.

FIG. 16 is a perspective view of a portion of the integrated charging receptacle showing the charging jack 75 attached to a charge port power wire 76. The stopper or protective cap 90 fits snugly into the port openings 12. A cap attachment cord 91 is secured to the protective cap 90 on one end and to a securing opening 94 on the cap attachment cord 91 opposite end. The securing opening 94 is removably securable to the securing pin 20. FIG. 17 is a perspective view of a portion of a second embodiment of the protective cover 87, charging jack 75 and hinge screw 89 with the protective cover in a partially closed position. FIG. 18 is a perspective view of a portion of a second embodiment of the protective cover 87, charging jack 75 and hinge screw 89 with the protective cover in an open position. The protective cover 87 sits snugly in the port opening 12 for sealing the charging jack 75 from moisture and debris.

The integrated charging receptacle 8 may be constructed of plastic, rubber, carbonate or any other material which may be formed, molded or cut.

As shown in FIGS. 1-12, the present invention is an integrated charging receptacle 8 including a ring body 10 having an inner ring wall 16 and an outer ring wall 18, a groove 14 between the inner ring wall 16 and outer ring wall 18 for securing a wire or cable and at least one USB receptacle having a receptacle jack, the USB receptacle disposed on a portion of the ring body. The receptacle jack faces outward from the outer wall of the ring body. The ring body may be secured around a cup holder mountable in a surface. The ring body 10 may be secured around an instrument gauge in a surface. The ring body 10 may be secured around a dashboard instrument. The integrated charging receptacle 8 may include a weather resistant stopper or protective cap 90 for sealing the USB receptacle 12 when the USB receptacle 12 is not in use, the protective cap 90 to the integrated charging receptacle 8 by a flexible attachment cord 91. The integrated charging receptacle may include a second USB receptacle having a second receptacle jack. The USB receptacle jack 75 may be powered through an electrical wire 76. The USB receptacle is powered through an electrical wire 76 passing through the body groove 14. The integrated charging receptacle 8 may include at least two additional USB receptacles or jacks 75. The ring body 10 may be substantially translucent wherein the ring body 10 includes at least one LED 100 for illuminating the ring body and wherein the LED 10 may be powered from a power source supplying power to the USB receptacle.

In another aspect of the present invention, FIGS. 13-15 show a method for installing an integrated charging receptacle 8. The method includes providing an integrated charging receptacle 8 having a ring body 10 including an inner ring wall 16 and an outer ring wall 18, the integrated charging receptacle 8 including a groove 14 between the inner ring wall 16 and outer ring wall 18 for securing a wire 76 or cable. The integrated charging receptacle 8 includes a USB receptacle jack 75, the USB receptacle jack 75 disposed on a portion of the ring body 10 wherein the receptacle jack 75 is facing outward from the ring body 10. More specifically, the receptacle jack 75 is facing outward from the outer wall 18 of the ring body 10. The method includes placing the integrated charging receptacle 10 around a device and mounting the device in an opening of a surface. The method may include a step of providing power to the receptacle jack 75 through an electrical wire 76 extending from an inside portion of the receptacle jack 75 to a power source before or after placing the integrated charging receptacle 8 around the device. The device may be a cup holder mountable in a surface. The device may be an instrument gauge mountable in a surface or a dashboard instrument mountable in a surface. The integrated charging receptacle 8 may include a second USB receptacle jack. The receptacle may be powered through an electrical wire 76 and the electrical wire may pass through the body groove 14. The integrated charging receptacle 8 may include at least two additional USB receptacles. The ring body 10 may be substantially translucent and the ring body includes at least one LED 100 for illuminating the ring body 10.

In another aspect of the present invention, FIGS. 13-15 show a method for using an integrated charging receptacle 8. The method includes providing an integrated charging receptacle 8 having a ring body 10 including an inner ring wall 16 and an outer ring wall 18, the integrated charging receptacle 8 including a groove 14 between the inner ring wall 16 and outer ring wall 18 for securing a wire 76 or cable. The integrated charging receptacle includes a USB receptacle jack 75 in the port opening 12, the USB receptacle jack 75 disposed on a portion of the ring body 8 wherein the receptacle jack 75 is facing outward from the ring body 10, wherein the integrated charging receptacle 8 is disposed about a device mounted in a surface. The method includes plugging one end of a USB cord into the receptacle jack 75 and plugging an opposite end of the USB cord into a device requiring charging Thus, the present invention provides one or more of the following advantages:

The invention provides a USB charging receptacle in a convenient location on a marine vessel or RV.

The invention provides a USB charging receptacle which is aesthetic.

The invention provides a USB charging receptacle which has a low profile.

The invention provides a USB charging receptacle for a device in a dashboard.

The invention provides a USB charging receptacle ring having multiple receptacles.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An integrated charging receptacle comprising:
a ring body having an inner ring wall and an outer ring wall;
a groove between the inner ring wall and outer ring wall for securing a wire or cable;
a USB receptacle having a receptacle jack, the USB receptacle disposed on a portion of the ring body;
wherein the receptacle jack is facing outward from the ring outer wall; and
a protective cap for sealing the USB receptacle when the USB receptacle is not in use,
wherein when sealing the USB receptacle, the protective cap is connected to the ring body by a flexible attachment cord having a first end connected to or integral with the protective cap and an opposite end secured to or integral with the ring body.

2. The integrated charging receptacle according to claim 1 further comprising a securing pin connected to or integral with the outer ring wall, and wherein the flexible attachment cord opposite end includes a securing opening securable to the securing pin.

3. The integrated charging receptacle according to claim 1 wherein the USB receptacle is powered through an electrical wire.

4. The integrated charging receptacle according to claim 1 wherein the USB receptacle is powered through an electrical wire passing through a portion of the body groove.

5. The integrated charging receptacle according to claim 1 including at least one additional USB receptacles.

6. The integrated charging receptacle according to claim 1 wherein the ring body is substantially translucent and the ring body includes at least one LED for illuminating the ring body and wherein the LED may be powered from a power source supplying power to the USB receptacle.

7. A method for installing an integrated charging receptacle comprising:
providing an integrated charging receptacle having a ring body including an inner ring wall and an outer ring wall, the integrated charging receptacle including a groove between the inner ring wall and outer ring wall for securing a wire or cable, a USB receptacle having a receptacle jack, the USB receptacle disposed on a portion of the ring body wherein the receptacle jack is facing outward from the ring body, and a protective cap for sealing the USB receptacle when the USB receptacle is not in use, wherein when sealing the USB receptacle, the protective cap is connected to the ring body by a flexible attachment cord having a first end connected to or integral with the protective cap and an opposite end secured to or integral with the ring body;

placing the integrated charging receptacle around a device; and mounting the device in an opening of a surface.

8. The method according to claim 7 including a step of providing power to the receptacle jack through an electrical wire extending from an inside portion of the receptacle jack to a power source before or after placing the integrated charging receptacle around the device.

9. The method according to claim 7 wherein the device is a cup holder mountable in the surface and wherein the method further comprises the step of engaging an outer surface of the cup holder with the inner ring wall of the integrated charging receptacle before mounting the cup holder in the opening of the surface.

10. The method according to claim 7 wherein the device is an instrument gauge mountable in the surface and wherein the method further comprises the step of engaging an outer surface of the instrument gauge with the inner ring wall of the integrated charging receptacle before mounting the instrument gauge in the opening of the surface.

11. The method according to claim 7 wherein the device is a dashboard instrument mountable in the surface and wherein the method further comprises the step of engaging an outer surface of the dashboard instrument with the inner ring wall of the integrated charging receptacle before mounting the dashboard instrument in the opening of the surface.

12. The method according to claim 7 including a second USB receptacle having a second receptacle jack.

13. The method according to claim 7 wherein the USB receptacle is powered through an electrical wire and wherein the method further comprises the steps of:

plugging one end of a USB cord into the receptacle jack; and plugging an opposite end of the USB cord into an electronic device requiring charging.

14. The method according to claim 7 wherein the USB receptacle is powered through an electrical wire passing through at least a portion of the body groove.

15. The method according to claim 7 wherein the ring body is substantially translucent and the ring body includes at least one LED for illuminating the ring body.

16. An integrated charging receptacle comprising:

a ring body having an inner ring wall and an outer ring wall;

a USB receptacle having a receptacle jack, the USB receptacle disposed on a portion of the ring body;

wherein the receptacle jack is facing outward from the ring outer wall; and a protective cover for sealing the USB receptacle when the USB receptacle is not in use, the protective cover pivotally connected to the ring body and pivotable between an open position permitting access to the receptacle jack and a closed position preventing access to the receptacle jack.

17. The integrated charging receptacle according to claim 16 further including a concealed hinge and wherein the protective cover pivots about the concealed hinge between the open and closed positions.

18. The integrated charging receptacle according to claim 16 including at least a second USB receptacle.

19. The integrated charging receptacle according to claim 18 wherein the protective cover seals every USB receptacle when in the closed position.

20. The integrated charging receptacle according to claim 16 wherein the ring body is substantially translucent and the ring body includes at least one LED for illuminating the ring body and wherein the LED may be powered from a power source supplying power to the USB receptacle.

* * * * *